United States Patent [19]

Witt

[11] 4,453,696
[45] Jun. 12, 1984

[54] DEVICE FOR ATTACHMENT OF A RESILIENT AND/OR FLEXIBLE TUBE ONTO A NIPPLE, NOZZLE OR LIKE CONNECTION

[76] Inventor: John E. Witt, Crosstrees, Oakcroft Rd., West Byfleet, Surrey, England, KT 14 6JH

[21] Appl. No.: 100,897

[22] Filed: Dec. 6, 1979

[30] Foreign Application Priority Data

Dec. 6, 1978 [GB] United Kingdom ............... 7847384
Dec. 11, 1978 [GB] United Kingdom ............... 7847944
Feb. 5, 1979 [GB] United Kingdom ............... 7903892

[51] Int. Cl.$^3$ ............................................. F16L 55/14
[52] U.S. Cl. ......................................... 251/4; 285/242
[58] Field of Search ............... 285/242, 260, 162, 239, 285/222, 192, 159, 255, 256, 259, 240, 241; 251/4, 10; 248/68 CB

[56] References Cited

U.S. PATENT DOCUMENTS

| 470,776 | 3/1892 | Beehler | 251/4 |
|---|---|---|---|
| 859,323 | 7/1907 | McDonnell | 251/4 |
| 2,425,935 | 8/1947 | Hayman | 248/68 CB |
| 2,592,130 | 4/1952 | Erb et al. | 285/260 |
| 2,995,334 | 8/1961 | Henderson et al. | 251/4 |
| 3,103,335 | 9/1963 | Martinez | 251/4 |
| 3,860,268 | 1/1975 | Zeman | 285/255 |
| 4,088,349 | 5/1978 | Guest | 285/255 |
| 4,232,712 | 11/1980 | Squires | 285/222 |

FOREIGN PATENT DOCUMENTS

| 36527 | 11/1885 | Fed. Rep. of Germany | 251/4 |
|---|---|---|---|
| 1306369 | 9/1962 | France | 251/4 |
| 105886 | 12/1923 | Switzerland | 251/4 |

Primary Examiner—Martin P. Schwadron
Assistant Examiner—Sheri Novack
Attorney, Agent, or Firm—Burmeister, York, Palmatier, Hamby & Jones

[57] ABSTRACT

A device for attachment of a resilient and/or flexible tube to a nipple, nozzle or like connection to enable the resilient and/or flexible tube to be retained on the nipple, nozzle or like connection in normal use.

In order to provide security for the resilient and/or flexible tube, a retaining element is provided which has an aperture therein of longer diameter than the tube with which it is intended to be used, the diameter of the aperture being large enough to pass over the tube when the tube is in position on the nipple, nozzle or like connection but small enough to cause the resilient and/or flexible tube to grip the nipple, nozzle or like connection.

16 Claims, 9 Drawing Figures

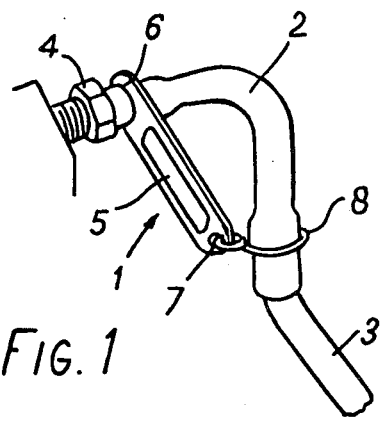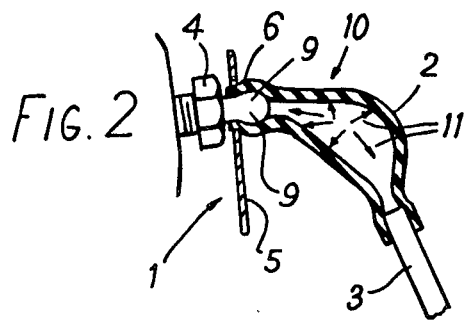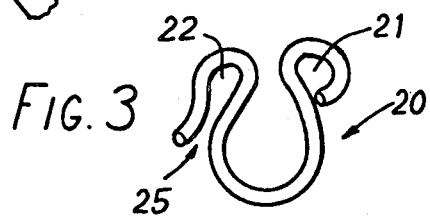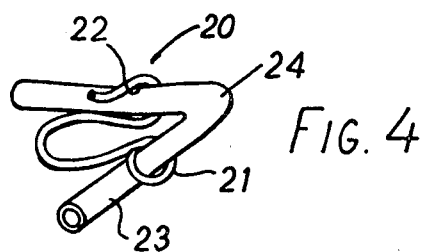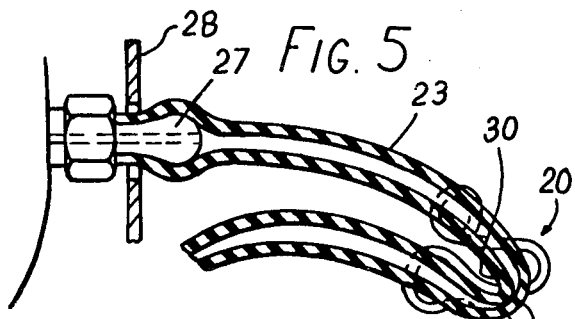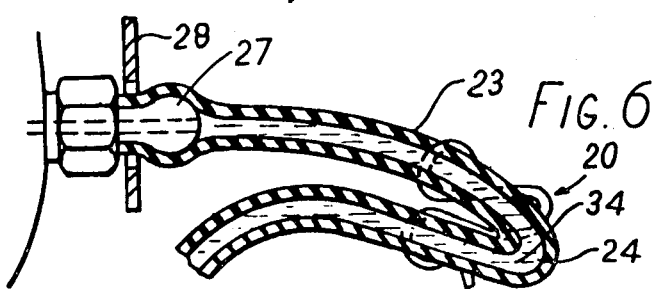

DEVICE FOR ATTACHMENT OF A RESILIENT AND/OR FLEXIBLE TUBE ONTO A NIPPLE, NOZZLE OR LIKE CONNECTION

This invention relates to a device for attachment of a resilient and/or flexible tube onto a nipple, nozzle or like connection and to bleeding equipment for use therewith.

The invention has particular application to the field of bleeding hydraulic equipment such as vehicle brakes and clutches for the attachment of a resilient and/or flexible bleed tube onto a bleed nipple of a brake or sleeve cylinder.

Up to the present time, there has only been marginal difficultly in attaching a resilient and/or flexible tube to a bleed nipple of ordinary relatively low pressure hydraulic equipment since the apparatus has usually used relatively large diameter tubes as there is only a relatively small pressure build up in the tubes, even in bleeders incorporating a one way valve. However, difficulty has been experienced on a number of occasions due to the resilient and/or flexible tube being blown off the nipple and this is undesirable even when it happens only rarely. Also systems using a higher pressure in the hydraulic system can cause severe difficulties and in one of the improved forms of bleeding equipment proposed here, pressure build up is a serious problem which has to be overcome if the advantages of such improved equipment are to be utilized.

The invention seeks to enable a resilient and/or flexible tube to be attached to a nipple, nozzle or like connection securely and in a simple and economical way.

According to a first aspect of the invention, there is provided a device for attachment of a resilient and/or flexible tube onto a nipple, nozzle or like connection comprises a retaining element have an aperture therein of larger diameter than the tube with which it is intended to be used, the diameter of the aperture being large enough to pass over the tube when the tube is in position on the nipple, nozzle or like connection but small enough to cause the resilient and/or flexible tube to grip the nozzle or like connection.

Preferably the size of the aperture is such that the grip is sufficient to present the tube being forced off the nipple, nozzle or the like connection in normal use. The apertured element may comprise a flat plate like element with a suitably dimensioned hole there through.

When the device is used in a brake clutch or the like bleeding device, a transparent tube may be inserted into the resilient and/or flexible tube.

According to a second aspect of the invention, there is provided a brake, clutch or the like bleeding device comprising a flat retaining element having at least three apertures therein, a resilient and/or flexible tube being threaded through first and second apertures in opposite directions and being connected to a transparent tube, threaded through the third aperture, at the second aperture and the first aperture being of a larger diameter than the resilient and/or flexible tube, being large enough to pass over the resilient and/or flexible tube when the tube is in position on a bleed nipple and being small enough to cause the resilient and/or flexible tube to grip the bleed nipple.

The resilient and/or flexible tube may have a valve arrangement therein. The valve arrangement may comprise a valve forming means which provides and retains a bend in the resilient and/or flexible tube sufficiently sharp to completely block the resilient and/or flexible tube at normal atmospheric pressure.

The advantage of the invention lies mainly in the security of the connection of the resilient and/or flexible tube to the nipple, nozzle or like connection.

The invention will now be described in greater detail, by way of example, with reference to the drawings, in which:

FIG. 1 is a view showing the use of a retaining element for prevention of the removal by accident of a bleeder from the bleed nipple;

FIG. 2 is a diagrammatic sectional view of the action of the retaining element shown in FIG. 1;

FIG. 3 is a view of a wire element use for forming a valve in a tube;

FIG. 4 is a view of the wire element of FIG. 3 in use;

FIGS. 5 and 6 are sectional views used to indicate the operation of the wire element valve shown in FIG. 4;

Figure 7:
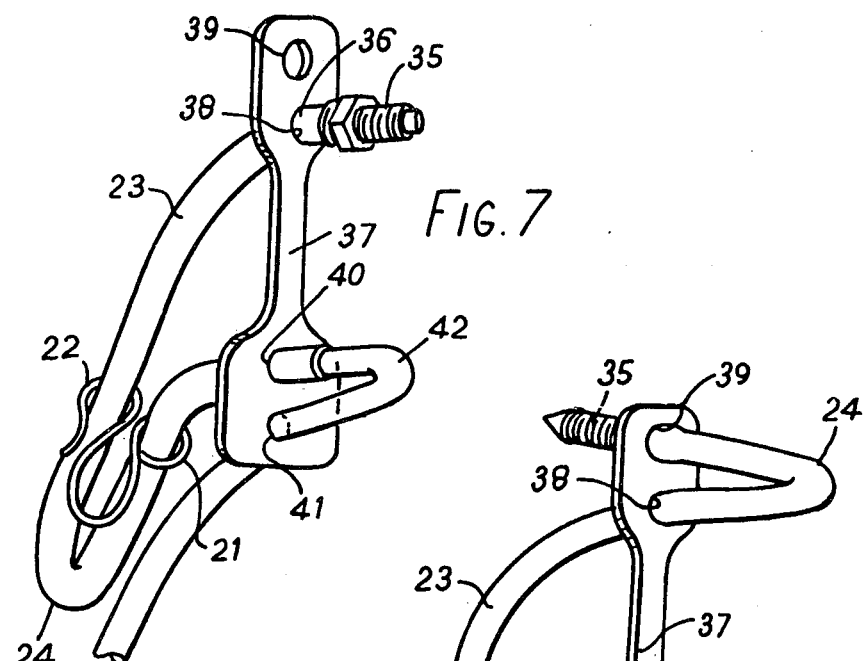
FIG. 7 is a perspective view of a practical form of bleeding device using the principle of the retaining element of FIG. 1 and the wire element of FIG. 3 with the valve in use.

Referring firstly to FIG. 1, a device for attachment of a resilient and/or flexible tube of a brake bleeder is shown with the tube connected to a bleed nipple. In this figure the device is indicated at 1, the resilient flexible tube is indicated at 2, attached to a transparent tube 3 and the bleed nipple is indicated at 4.

The device 1 comprises a flat plate-like element 5 having a first aperture 6 at one end and a small aperture 7 at the other end. As will be referred to particularly hereafter in connection with FIG. 2, the aperture 6 is larger than the diameter of the tube 2 and is in fact large enough to pass over the head part of the bleed nipple 4 when the tube is pushed thereon.

The flexible tube 2 is secured to the transparent tube 3 by pushing the transparent tube 3 into the flexible tube 2 and securing the two together by means of a wire clip 8. Suitably the wire clip 8 may also be used to secure the plate-like element 5 to the brake bleeder, using the small aperture 7. A one-way valve may be provided either at the end of the tube 3 or at an intermediate position thereof. If a small base transparent tube is used, the one-way valve may not be necessary.

The operation of the device will now be described with additional reference to FIG. 2. For ease of illustration, the parts are shown in FIG. 2 stretched out sideways, connection between the plate-like element 5 and the bleeder not being shown.

Before attaching the flexible tube 2 to the bleed nipple 4, whose head 9 can be seen in FIG. 2, the plate-like element 5 is pushed well back along the flexible tube 2 so that a section of the flexible tube 2 protrudes from the aperture 6. Then the free end of the flexible tube is pushed over the head 9 of the bleed nipple 4 as far as it will go. Thereafter the plate-like element is passed along the flexible tube 2 until it passes over the head 9 of the bleed nipple 4 to take up the position shown. This will cause the tube 2 to grip the nipple 4 and prevent significant bulging or spreading of the end of the flexible tube 2. The nipple is then unscrewed in the usual way and the brake pedal pumped to bleed the brakes.

As can be seen from FIG. 2, only the middle portion 10 of the flexible tube 2 can expand under pressure, as indicated by the arrows 11, the free end of the flexible tube being restrained by the edges of the aperture 6 in the plate-like element 5. Thus no brake fluid can pass back around the head 9 of the bleed nipple 4, braking the seal between the flexible tube and the bleed nipple and allowing pressure to be taken up which might otherwise force the flexible tube 2 off the bleed nipple 4.

The transparent tube 3 and/or an extension thereof on the other side of the one way valve may have a very small internal diameter, of the order of 1/16 inch or less, and may extend to a length as required to bring the tube to a position which is visible to the operator. With a tube of this order, a stroke of the brake pedal can fill a length of tube of the order of 8–10 ft. (Ignoring the brake fluid in the flexible tube 2), with a small base tube of this length the valve is not usually necessary.

FIGS. 3 and 4 illustrate a wire element 20 which functions to form a valve. The tube 23 in the embodiments of FIGS. 4 through 9 is equivalent to the tube 2 illustrated in FIGS. 1 and 2. The wire element 20 is formed in a U-shape with the two opposite ends curled back on each other to form apertures 21 and 22.

One aperture 22 has a keyhole like shape and is open at 25 at one side of the element. This enables quick insertion and release of one part of the tube 23 which enables the valve to be opened out and effectively removed. The other aperture 21 is completely closed.

FIG. 5 shows the flexible tube 23 with the wire element 20 in the position which it takes up when initially attached to a bleed nipple 27. A retaining element, for example as shown in FIGS. 1 and 2 is shown at 28. As can be seen, with no pressure present in the tube 23, the opposite sides 30 and 31 of the tube will be forced together by the sharpness of the curve in the tube and will effectively provide a shut off valve. Once pressure is applied to the tube e.g. by the flow of brake or clutch fluid from the released nipple 27, the tube 23 will swell and will provide a passageway for the brake fluid 34 around the bend 24 as is shown in FIG. 6. Once the pressure is removed the tube will return to its configuration as shown in FIG. 5 and in this way will seal the brake system successfully.

It will be observed that pressure in either direction will open the valve but this is of no significance since the only pressure which is sufficient to open the valve during a brake or clutch bleeding operation is that of the brake fluid from the brake system, the other side of the valve usually being of atmospheric pressure.

FIG. 7 shows the use of the valve arrangement for a brake bleeding operation, a brake nipple being indicated at 35 and shown removed from the brake cylinder into which it is normally screwed. As can be seen, the full length of the tube 23 enables one end of the tube to be pushed over the nipple portion of the bleed nipple at 36, it being retained thereon by means of a strap member 37. The retaining strap 37 is provided with four apertures 38, 39, 40 and 41 in two pairs, one aperture 38 of the pair of apertures 38 and 39 at one end of the strap 37 receiving the flexible tube 23 and one aperture 40 of the lower pair of apertures 40 and 41 receiving the other end of the flexible tube 23. Into the lower end of the flexible tube 23 is connected a transparent tube 42 which is then passed back through the aperture 41 to assist in its retention. The tube 42 may be of any suitable length, preferably being a small bore tube 8 to 10 foot in length, the free end of which is suitably inserted into or connected to a container (not shown) for receiving brake or clutch fluid which is pumped out during a bleeding operation.

The wire element 20 provides for a valve action in the tube 23 at 24. It is to be noted that the strap 37 is provided with two upper apertures 38 and 39, the aperture 38 being arranged to hold the tube 23 on the bleed nipple 35, the aperture 39 being unused in FIG. 7. Suitably the two apertures 38 and 39 are of different sizes so that they can be used with different sizes of bleed nipples provided that sufficient stretch and flexibility is present in the tube 23. Thus FIG. 7 shows the use of the lower aperture 38 for a small bleed nipple 10 while FIG. 8 shows the use of the upper aperture 39 for a large bleed nipple 44.

Figure 8:
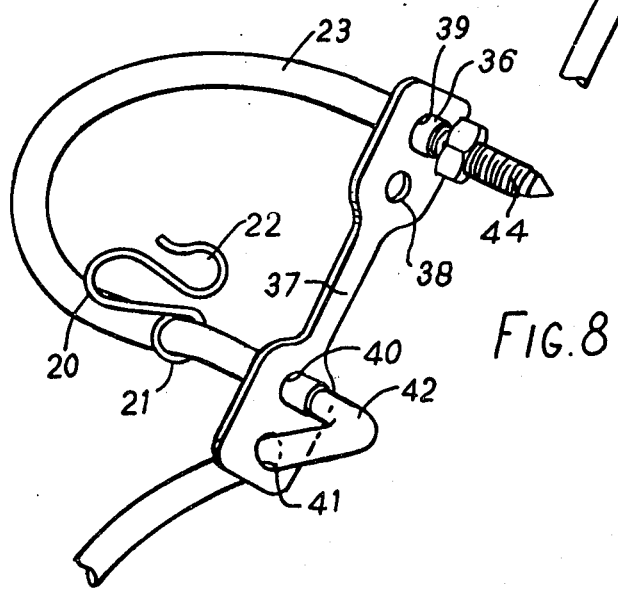
FIG. 8 is a perspective view of the apparatus shown in FIG. 7 but with wire element unclipped and the retaining element set up for a different size of bleed nipple.

FIG. 8 demonstrates the use of the open slotted portion 25 in the wire element 20 to enable the valve to be opened and the valve action provided at 24 to be dispensed with.

This is useful in brake bleeding operations where the small bore tube is used as usually in this case the valve is not needed, the length of the tube being a sufficient safeguard against indrawn air. Thus the tube 23 is forced out of the slot 25 thus removing the restricted bend 24 and allowing full flow of fluid through the tube 23. As will be appreciated, when it is desired to return to the valve action, it is a simple matter to push the tube 23 back through the slot 25 into the aperture 22.

As is usual in brake bleeding operations, the transparent tube 17 is preferably connected with a container or the like (not shown) for receiving the bleed fluid.

Figure 9:
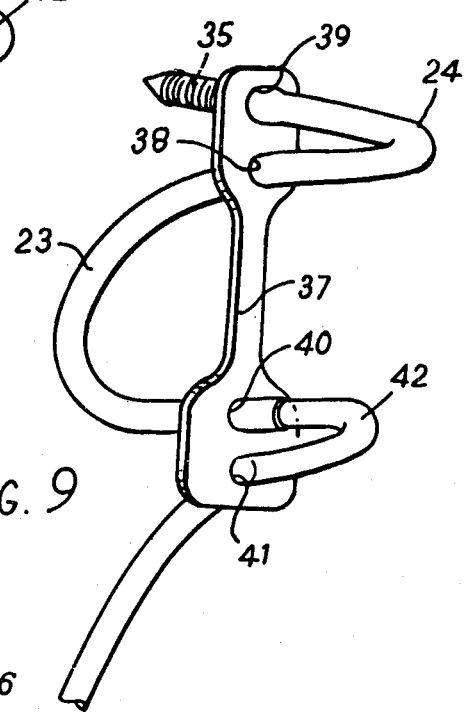
FIG. 9 is a perspective view showing how the retaining element of FIGS. 7 and 8 can be used to form a valve without the use of the wire element.

FIG. 9 shows the possibility of providing a valve using only the retaining element 37. In this case, the tube 23 is threaded through both of the upper apertures 38, 39 so as to provide the bend 24 in the tube 23 with the desired valve action. In this case the apertures 38 and 39 may be of the same dimensions. To provide for use with different sizes of bleed nipple, three apertures could be provided, the upper aperture being, for example, smaller than the other two. Thus for larger nipples the middle and lower apertures would be used (the middle aperture providing the retention on the nipple) and for smaller nipples the middle and upper apertures would be used (the upper aperture providing retention on the nipple).

It will be appreciated that various modifications could be made to the above described embodiments without departing from the scope of the invention.

For example, the wire valve element could be replaced by a suitable moulded or extruded plastics chip arrangement. Two of the valved resins could be used together on opposite sides of a tube for sampling purposes.

The invention claimed is:

1. A device for attachment onto a bleed nipple of the brake system of a motor vehicle in which the nipple is provided with a smooth bulbous head portion at one end thereof and tapers inwardly to a portion of minimum diameter adjacent to the head portion and remote from said end comprising a flat plate having an aperture therein of large diameter than the nipple, said aperture forming a substantially smooth wall in the plate disposed at a fixed distance from the center of the aperture, a flexible tube having a diameter smaller than the aperture constructed of resilient material, said tube having an axial channel extending therethrough with a diameter smaller than the nipple and being stretchable to accommodate the nipple at an end of said tube, said tube extending through the aperture and confronting the wall of the plate the diameter of the aperture being smaller than the diameter of the tube when the tube end is stretched over and accommodating said nipple, the aperture being large enough to permit the plate to be forced past the head of the nipple when the tube end is accommodating said nipple, whereby said tube may be stretched over the nipple and the plate thereafter forced over the nipple to retain the tube end and nipple in coupled relation.

2. A device as claimed in claim 1, wherein the size of the aperture is such that the grip is sufficient to prevent the tube being forced off the nipple in normal use.

3. A device as claimed in claim 1, wherein attachment means are provided for attaching the plate like element to the resilient flexible tube.

4. A device as claimed in claim 3, wherein the attachment means comprises a wire clip having a first portion passing through a second aperture in the plate and a second portion forming a loop through which the flexible tube is threaded.

5. A bleeding device comprising a device as claimed in claim 1 in combination with a second tube inserted into the first flexible tube, said second tube being of lesser resiliency than the first flexible tube and being transparent.

6. A bleeding device as claimed in claim 5, wherein the second transparent tube and the first flexible tube are connected together by means of a wire clip which also forms an attachment for the retaining element to the first flexible tube.

7. A bleeding device as claimed in claim 5, wherein the transparent tube and the flexible tube are connected together by passing them through a suitably dimensioned aperture in the plate.

8. A bleeding device for attachment onto a bleed nipple of a brake system of a motor vehicle in which the nipple is provided with a smooth bulbous head portion at one end thereof and tapers inwardly to a portion of minimum diameter adjacent to the head portion and remote from said end comprising a flat retaining element having first, second and third apertures therein, a resilient flexible tube threaded through the first and the second apertures in opposite directions, said flexible tube having an axial channel extending therethrough with a diameter smaller than the nipple and being stretchable to accommodate the nipple at an end of said flexible tube a transparent tube threaded through the third aperture and connected to the flexible tube at the end thereof adjacent to the second aperture, the diameter of the first aperture being larger in diameter than the resilient flexible tube and smaller than the diameter of the tube when the tube end is stretched over and accommodating said nipple, and the diameter of said aperture being large enough to permit the plate to be forced past the head of the nipple when the tube end is accommodating said nipple, whereby the end of said tube may be stretched over the nipple and the plate thereafter forced over the nipple to retain the tube and nipple in coupled relations.

9. A bleeding device as claimed in claim 8, wherein the resilient flexible tube has a valve arrangement therein.

10. A bleeding device as claimed in claim 9, wherein the valve arrangement comprises a valve forming means which provides and retains a bend in the resilient flexible tube sufficiently sharp to completely block the resilient flexible tube at normal atmospheric pressure.

11. A bleeding device as claimed in claim 10, wherein the valve forming means comprises an element having two adjacent apertures through which the resilient flexible tube passes.

12. A bleeding device as claimed in claim 11, wherein at least one of the adjacent apertures is open to one side like a keyhold aperture whereby the resilient flexible tube can be removed or inserted through the open part of the aperture.

13. A bleeding device as claimed in claim 11, wherein the valve forming means comprises a wire element bent round to provide the apertures.

14. A bleeding device as claimed in claim 11 wherein the two apertures are provided in the retaining element, one aperture being the said first aperture and the other aperture being a fourth aperture adjacent to the first aperture.

15. A bleeding device as claimed in claim 5, wherein the transparent tube comprises a small bore tube whose internal diameter is significantly smaller than the internal diameter of the resilient flexible tube.

16. A bleeding device as claimed in claim 15 wherein the internal diameter of the transparent tube is no greater than 1/16 inch.

* * * * *